Nov. 3, 1953

L. MILLER 2,657,944

COUPLING FOR TUBULAR MEMBERS

Filed June 17, 1949

INVENTOR.
LOUIS MILLER
BY
ATTORNEY

Patented Nov. 3, 1953

2,657,944

UNITED STATES PATENT OFFICE 2,657,944

COUPLING FOR TUBULAR MEMBERS

Louis Miller, Akron, Ohio

Application June 17, 1949, Serial No. 99,677

1 Claim. (Cl. 287—2)

This invention relates to a coupling for tubular members. The coupling provides a smooth and uninterrupted union between two tubular members by frictional engagement therewith. It may be used to particular advantage in the construction of monorails, and may be used also in the fabrication of various structures from tubular members, including tubular electrical conductors, pipe railings, etc.

A monorail is the name generally used to denote a track along which may be slid hooks, rollers, or other carriers from which objects are suspended. In certain industries monorails are used to transfer small articles and materials to various processing stations. They are also used for carrying curtains, draperies and the like. A monorail may be conveniently made from lengths of pipe, and in order for the hooks to slide freely along the pipes the couplings between them must be flush with the surface of the pipes.

The couplings designed for this purpose and presently available on the market are usually difficult to install since it is necessary to drill or otherwise cut the ends of the pipe sections to connect the couplings therewith. Other couplings which are designed for frictional engagement with the pipes are expensive, complicated devices.

The coupling of this invention is formed with a cylindrical body portion having an expansible projection at each end thereof. In the body portion there is a radially disposed slot which extends longitudinally of the body and the expansible projections. This slot passes nearly through the body portion, and preferably passes entirely through the projections, dividing them into two separate parts. It divides the body portion into two sections which are hinged together by a thin strip of the body material remaining between the bottom of the slot and the outside surface of the body portion. The expansible projections at each end of the body portion are adapted for insertion into the ends of adjacent pipes where, by suitable means located in the body portion, they are expanded against the inner walls of the pipes and held in frictional engagement with them.

The preferred expanding means is one or more setscrews which are threaded through one section of the body portion of the coupling and bear against the other section. When tightened, these screws widen the slot between the two sections of the body portion and thus expand the projections bringing them into tight frictional engagement with the interior of the pipes. The setscrews or other expanding means do not contact any part of the projections, nor do they contact either of the pipes. Consequently the ends of the pipes need not be threaded or otherwise machined as is necessary when other types of couplings are used. The coupling is readily disconnected from the pipes by loosening the setscrews.

In a monorail assembly, the supporting means for the assembly may be located at the coupling. Wherever located it is so designed that it does not interfere with the passage of hooks or carriers along the rail.

The coupling will be further described with reference to the drawing, in which—

Figure 1:
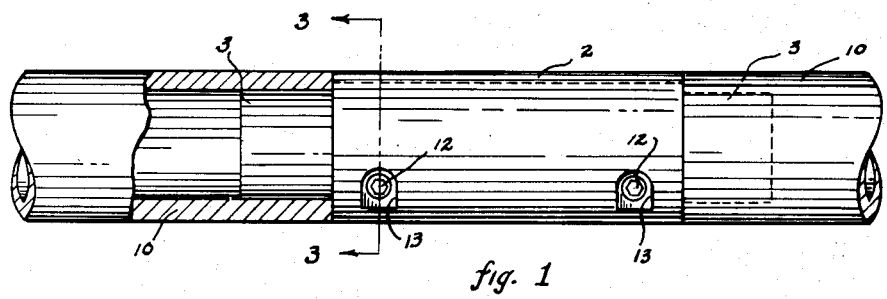
Fig. 1 is a side elevation of the coupling connecting two pipes.
Figure 2:
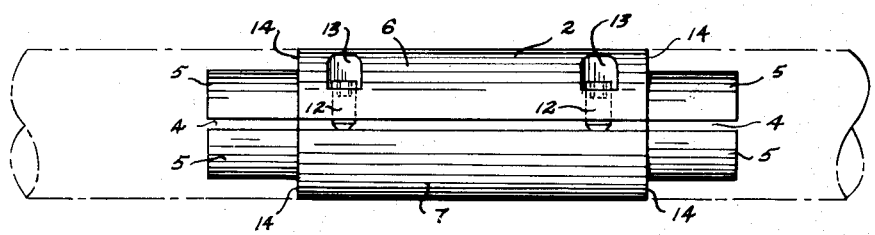
Fig. 2 is a bottom view of the coupling, the pipes being shown in broken lines.

The preferred coupling comprises a cylindrical body portion 2 and is formed with an expansible projection 3 of smaller diameter than the body portion at each end thereof concentric with the body portion. A slot 4 passes radially into and almost through the body portion, and divides the end projections into separate parts 5. This slot divides the body portion into two sections 6 and 7 which remain joined together only by a thin strip of material 8 which remains between the bottom of the slot and the outside surface of the body portion. Strip 8 acts as a hinge between sections 6 and 7. The projections 5 are rigidly connected to the sections 6 and section 7 and move with them.

Figure 3:
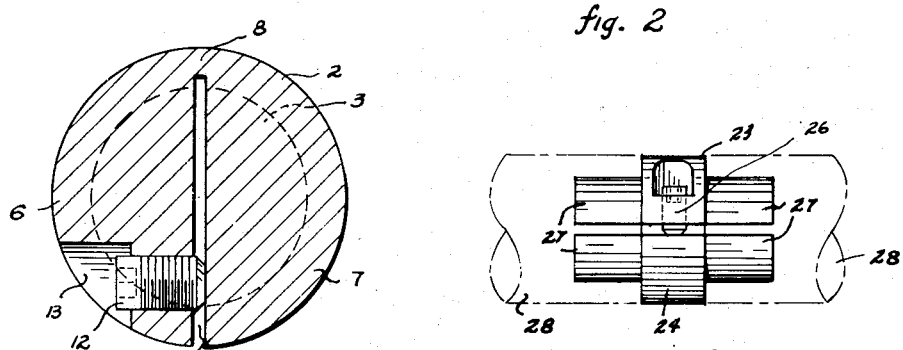
Fig. 3 is a sectional view taken on the line 3—3 of Fig. 1.

The projections 5 at each end of the body portion are adapted for insertion into the ends of pipes 10 (Fig. 1) and they are expanded into frictional engagement with the walls of the pipe by Allen setscrews 12 which are threaded through each end of the section 6 of the body portion near the projections. They are located in suitable recesses 13 so that their heads are below the surface of section 6 and will not interfere with hooks or the like which are adapted to slide freely along the pipes and over the coupling. The base of each screw is in contact with section 7 (Fig. 3), When the setscrews are tightened they exert pressure on section 7 thereby urging it away from section 6 and expanding the projections. When they are loosened the sections 6 and 7 spring back to their original position and the pressure exerted on the pipes by the expanded projections is relieved.

The surface 14 at each end of the body portion is flat so that the ends of the pipes abut the body portion snugly. The unexpanded circumference of the projections is just less than the inner circumference of the pipes, and the expanded circumference is greater than this circumference of the pipes. To install the coupling, the projections in an unexpanded condition, are merely slipped into the ends of the pipes and the setscrews are tightened to effect frictional engagement with the pipes. The ends of the pipes need not be cut or machined in order to insert the coupling and the expanding means for the coupling are independent of the pipes and the expansible projections.

Figure 4:
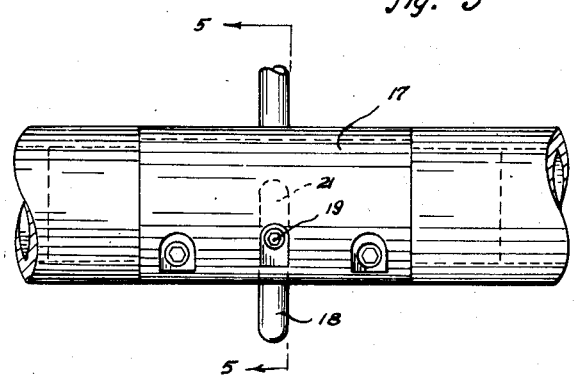
Fig. 4 is a side elevation of the coupling in a monorail with a supporting hook installed therein.
Figure 5:
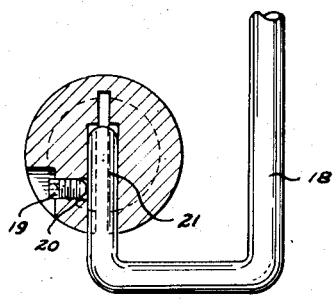
Fig. 5 is a sectional view taken on the lint 5—5 of Fig. 4.

The coupling 17 shown in Figs. 4 and 5 is a modification of the coupling of Fig. 1 in that coupling 17 is particularly designed for monorail construction. This coupling is provided with a supporting hook 18, one end of which is fastened by an Allen setscrew 19 in a hole 20 which extends upwardly into the coupling from a lower side thereof. The shank 21 of the hook may be fastened to the ceiling of the plant or to any suitable anchoring means for the monorail.

Figure 6:
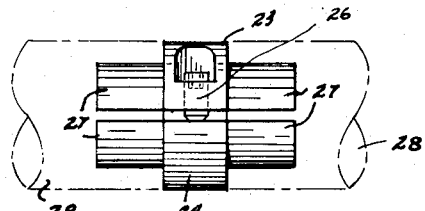
Fig. 6 is a front view of a modified form of the coupling.

Fig. 6 shows a coupling 23 which is a further modification of the coupling shown in Fig. 1 and is preferred for lighter structures. It is similar in operation to the other couplings but its body portion 24 is much shorter. In coupling 23, body portion 24 is so short that one setscrew 26 expands the projections 27 at each end of the body portion. Projections 27 extend into pipes 28 shown by the broken lines.

The coupling may be made in two separate sections instead of in one piece hinged by the strip 8, in which case the setscrews will be located closer to the center of the body portion. However, it is generally more convenient to install a coupling with hinged sections. The coupling may be made in a number of sizes and may be made of different construction materials, depending on the size of the pipes and the use to which they are to be put. The projections 5 may be of any shape which will permit them to grip the interior of the pipes tightly. Although the slot is preferably radial, this is not essential. The body portion may be made to any convenient length and it may be bent to form a curve if necessary. Usually, however, the coupling will be used where the pipe sections being connected are axially aligned.

Frequently the piping used in structures of this nature is not of the same quality as piping used for carrying fluids, etc. The internal diameters may vary slightly and this presents difficulties where the coupling is designed to be threaded into the pipes. With the coupling of this invention, suitable shims or cushioning material may be employed around the expansible projections if necessary, to allow for such irregularities. The coupling is inexpensively manufactured and requires no replacement parts. It is preferably steel and may be conveniently turned from round bar stock although any material possessing strength and an appreciable amount of resiliency may be used.

What I claim is:

In combination, two tubular members of the same outside and inside diameters coupled by a member comprising a cylindrical body portion of the same outside diameter as the outside diameter of the tubular members with the ends of the tubular members abutting it, a cylindrical projection at each end of the body portion and expanded against the inner surfaces of the tubular members, a slot starting at the surface of the body portion and extending the length of the body portion and the two cylindrical projections and extending more than half way through each diametrically, and a setscrew threaded in the body portion on one side of the slot with its base turned against the slot surface of the body portion on the side of the slot whereby the coupling is expanded as aforesaid, and with the head of the setscrew at least flush with the outer surface of the body portion.

LOUIS MILLER.

References Cited in the file of this patent

UNITED STATES PATENTS

| Number | Name | Date |
|---|---|---|
| 281,405 | Seidel | July 17, 1883 |
| 1,024,344 | Langevin | Apr. 23, 1912 |
| 1,464,982 | Ferris | Aug. 14, 1923 |
| 1,678,350 | Ott | July 24, 1928 |
| 2,446,924 | Hawes | Aug. 10, 1948 |
| 2,581,032 | Landsman | Jan. 1, 1952 |

FOREIGN PATENTS

| Number | Country | Date |
|---|---|---|
| 301,865 | Italy | Oct. 13, 1932 |
| 421,871 | Great Britain | Jan. 1, 1935 |
| 423,783 | Great Britain | Feb. 7, 1935 |